United States Patent [19]

Hoffman et al.

[11] 4,281,436
[45] Aug. 4, 1981

[54] SHRIMP PROCESSING MACHINE

[76] Inventors: Paul H. Hoffman, 18003 NW. 78th Ave., Hialeah, Fla. 33015; John A. Lessig, 4140 Hardie Ave., Miami, Fla. 33133

[21] Appl. No.: 37,396

[22] Filed: May 8, 1979

[51] Int. Cl.³ .............................................. A22C 29/02
[52] U.S. Cl. ........................................... 17/72; 17/73
[58] Field of Search ...................................... 17/72, 73

[56] References Cited

U.S. PATENT DOCUMENTS

| | | | |
|---|---|---|---|
| 3,220,050 | 11/1965 | Lagasse | 17/72 |
| 3,867,740 | 2/1975 | Lapine et al. | 17/72 |
| 4,087,887 | 5/1978 | Hoffman et al. | 17/73 |

Primary Examiner—Willie G. Abercrombie
Attorney, Agent, or Firm—Barry L. Haley

[57] ABSTRACT

A shrimp processing machine wherein conveyor means transports shrimps past a serrated cutter wheel, severing the abdominal shell while disrupting the swimmerets and the musculature interconnection between the swimmerets and the shrimp body, said shrimp thereafter being pneumatically transferred onto needles of a driven disc, said disc carrying the shrimp to a further station wherein the shells are removed and the vein is removed. A further cut may be made to "butterfly" the shrimp. A second disc with needles thereon effect transfer of the processed shrimp from the first disc.

1 Claim, 14 Drawing Figures

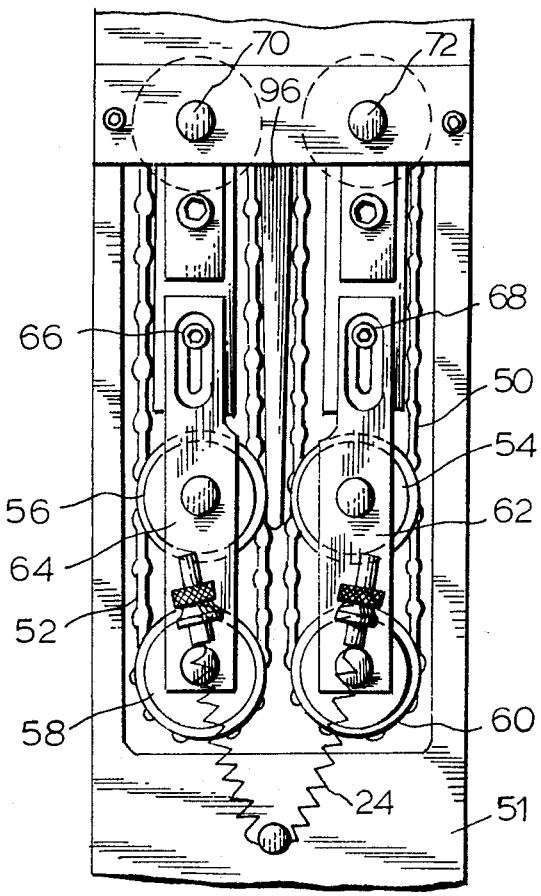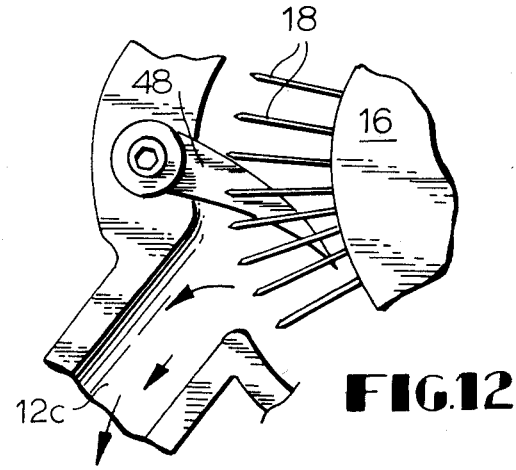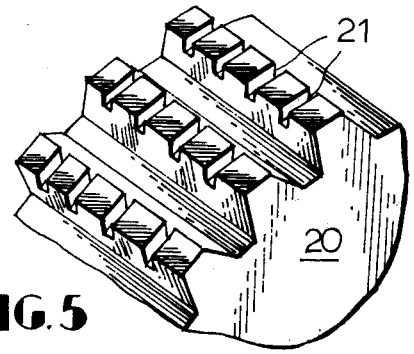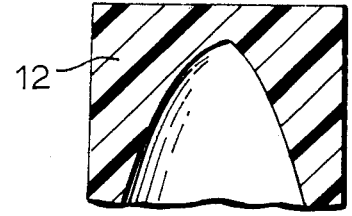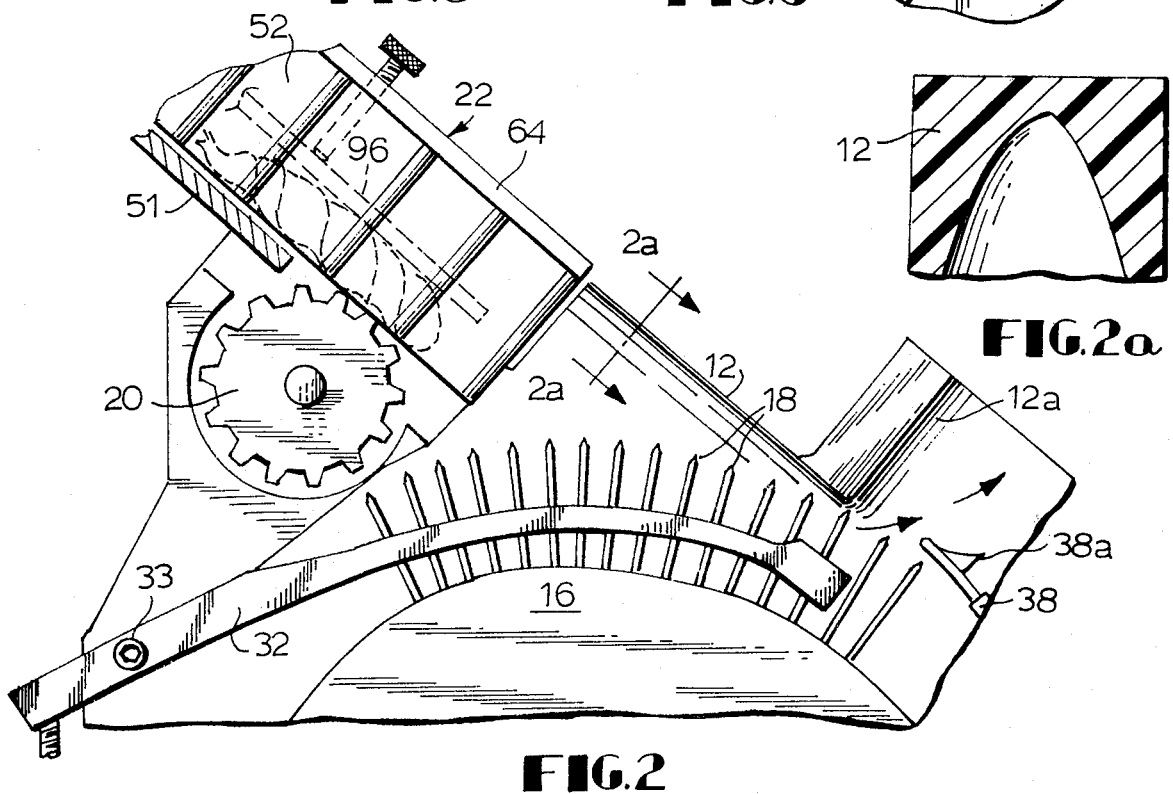

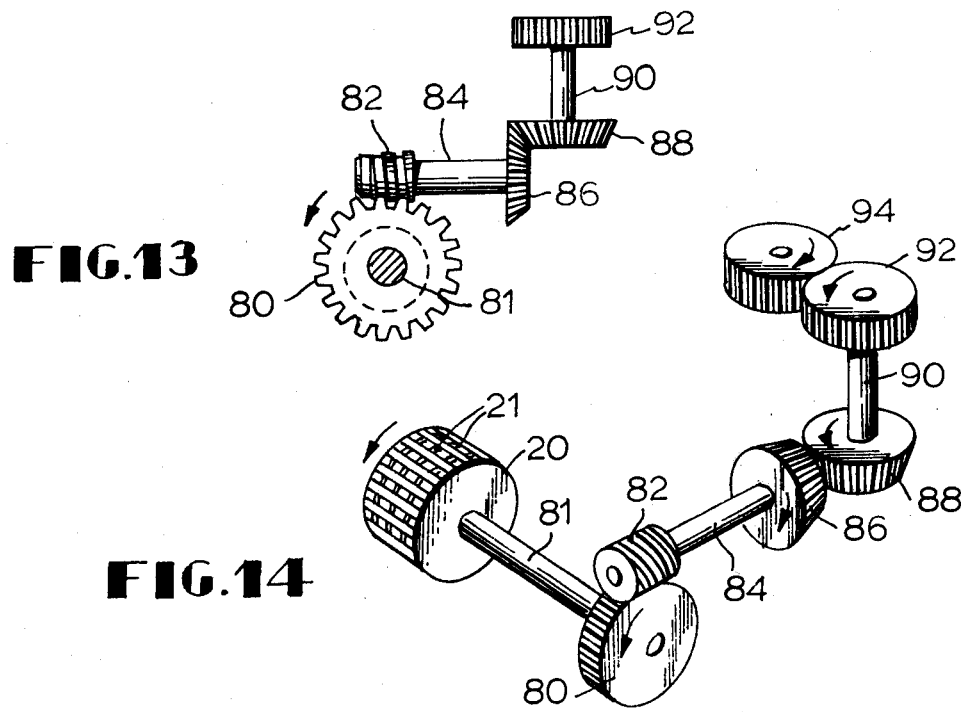
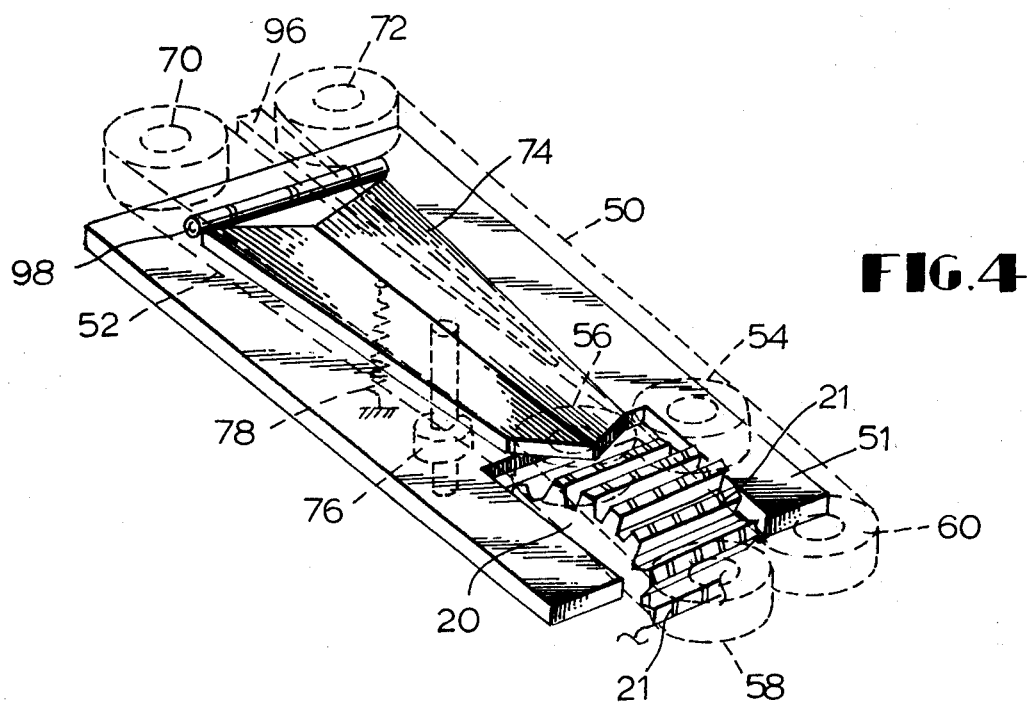

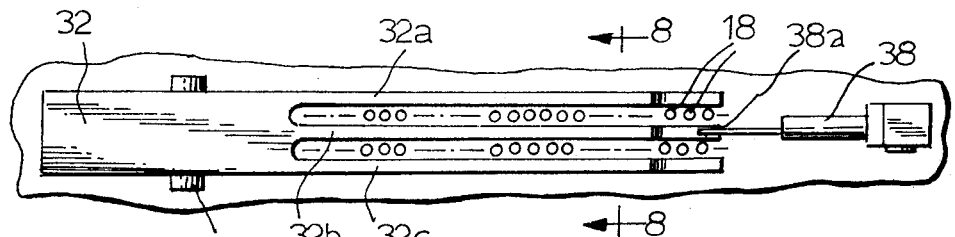
FIG.7
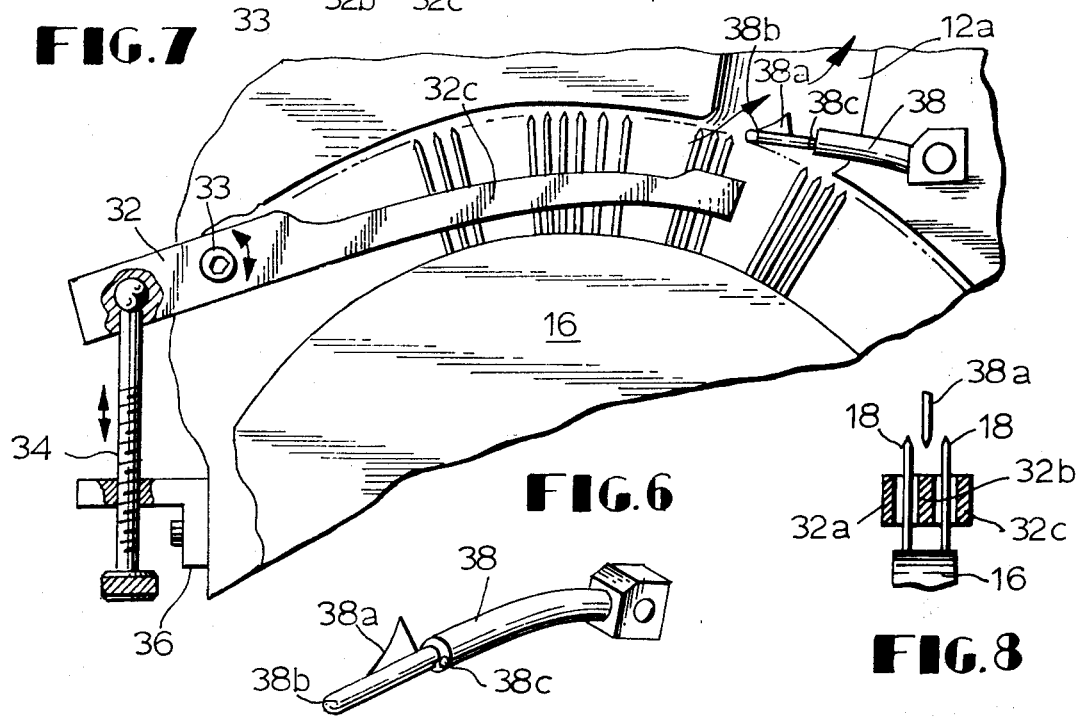
FIG.6
FIG.9
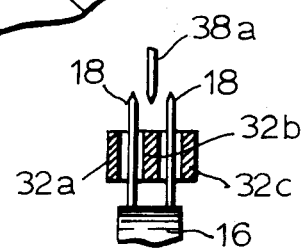
FIG.8
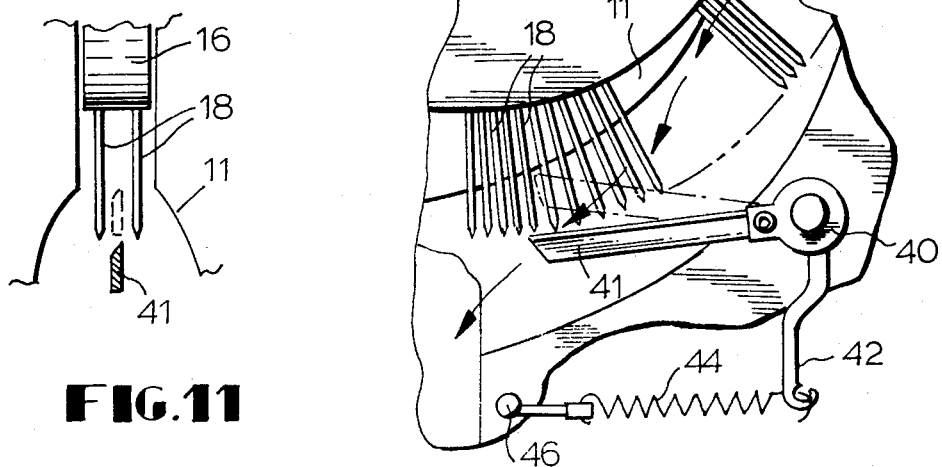
FIG.11
FIG.10

SHRIMP PROCESSING MACHINE

BACKGROUND OF THE INVENTION

This invention relates generally to an improved apparatus for reliably and effeciently removing the first five shell segments, the ventral appendages, and the sand vein to produce a "fantail" shrimp.

In applicant's prior invention described in U.S. Pat. No. 4,087,887, the disclosure of which is herein incorporated, a method and apparatus for processing fantail shrimp was shown which, among other things, shows a device in which the ventral membrane of the shrimp body is longitudinally severed by a serrated blade edge disposed within an internal housing tunnel as the shrimp is transported on a moving disc. Also, the shrimp once processed was removed from the housing by advancement of the disc and shrimp body relative to an arcuate stripper blade extending between the rows of needles on the disc which displace the impaled shrimp outwardly of the needles.

The present invention, among other aspects, provides for an inlet trough outside of the housing which accomplishes alignment of the shrimp body in a desired attitude for pneumatic induction into the housing while concomitantly severing the thin abdominal shell and disrupting the swimmerets and the interconnection between the swimmerets and the shrimp body prior to entry into the housing.

BRIEF DESCRIPTION OF THE INVENTION

An apparatus for continuously processing deheaded shrimp to quickly and reliably remove the front five shell segments and sand vein, to disrupt the ventral appendages, and if desired to butterfly the processed shrimp body.

Briefly the apparatus is comprised of a housing having an internal tunnel of a selected shape that cooperates with a positively-driven, first disc having peripheral needles disposed thereon, the internal housing tunnel shape being useful for guiding an impaled shrimp through the housing through various processing stages. An inlet trough includes vertical conveyors that engage the lateral sides of each shrimp body under tension and a serrated wheel along the trough floor for severing the thin membrane of the shrimp in conjunction with disruption of the ventral appendages, which is positioned prior to the tunnel entrance to the housing. Removal of the shrimp from the housing is accomplished by a second disc having peripheral needles which cooperate with a tunnel of a selected shape for ejection of each shrimp in a desired posture for further processing such as cleaning, inspection and breading.

Pneumatic forces induced within the internal tunnel in the housing effects transfer of the shrimp into the trough, from the trough into the tunnel entrance, effects displacement and breaking of the first five shell segments from the sixth shell at the condyle joints and effects removal of the sand vein, ventral appendages and shell from the housing into a waste collection area. The removal of the sand vein may also be assisted by hydraulic pressures directed onto the exposed mid-gut vein during transport through the housing.

At the first processing station, each shrimp is sequentially advanced along the inlet trough by vacuum, then conveyor having moving vertical walls that resiliently engage the lateral side of each shrimp body, under tension, to effect attitude alignment and transport over a rotating cylinder having a serrated exterior surface which projects slightly above the floor of the inlet trough, the cylinder rotating at its exterior faster than but in the same direction as the conveyor walls to effectively sever longitudinally the thin abdominal shell or membrane while simultaneously disrupting the swimmerets and the interconnection between the swimmerets and the shrimp body. The floor of the inlet trough includes a hinged section that has a vertical adjustment and that is trough-shaped to allow for attitude adjustment of the shrimp of varying sizes. Additionally, above the hinged trough, an adjustable pressure arm extends above and between the conveyor walls to apply downward pressure on the shrimp for attitude adjustment and for holding the shrimp against the serrated wheel from the dorsal direction to cause proper disruption. After ventral disruption the shrimp is pneumatically transported to the entrance of the internal housing tunnel where pneumatic forces introduce the shrimp into a tunnel of selected shape at a proper attitude where the shrimp body is ventrally impaled upon the needles of the first moving disc. As the shrimp moves internally in the housing to the second processing station, the tunnel is shaped to dorsally apply pressure for further impalement at a desired position in conjunction with an arcuate lever arm disposed between and on each side of the rows of needles to apply ventral pressure on the shrimp to raise the front end of the shrimp prior to its arrival at the second processing station. This interaction on the shrimp body both from a dorsal and ventral direction provides for optimum and precise positioning in attitude of each shrimp regardless of size.

The second processing station includes a housing outlet shell removal passage which joins at approximately ninety degrees the internal tunnel that guides the shrimp, the shell removal passage being maintained under a vacuum with pneumatic forces. In proximity to the outlet vacuum passage opening into the tunnel area, a peeling arm is positioned so as to precisely intersect the front dorsal area of the shrimp body as it moves past the outlet vacuum passage opening. The peeling arm includes a rounded somewhat blunt end tip and a knife edge which engage the upper front dorsal area of the shrimp, expanding it while the knife edge causes a cut along the dorsal area longitudinally to expose the midgut vein. Also, the peeling arm acts to assist if necessary for the removal of the shell. The housing includes enlarged openings on each side which are in fluid communication with the junction of the internal tunnel and the outlet pneumatic passage to enhance the volume and dictate the direction of the pneumatic force experienced by the shrimp shell segments as they pass the outlet pneumatic passage. The pneumatic force displaces the previously severed shell (the first five shell segments) in such an attitude that it effectively breaks the condyle joints separating the first five shell segments from the sixth shell segment which remains on the shrimp body. The peeling arm which can also remove the first five shell segments if necessary, provides additional assistance for the breaking of the condyle joints and effective removal of the shell from the meat of the shrimp. Once severed, the shell under pneumatic induction is then transported down the outlet passage to a waste disposal container as are the swimmerets and other ventral appendage debris coming from the inlet trough. The peeling arm may include a hydraulic spray for hydraulic treatment of the exposed mid-gut vein, once severed by the peeling arm, to insure removal of the mid-gut vein.

If it is desired to provide a processed fantail shrimp having a "butterfly" configuration, the next station includes a knife blade that interacts with the moving shrimp body to cut the shrimp meat dorsally to a desired depth.

At this station the internal tunnel is selectively shaped to provide ventral guidance on the shrimp body to insure the proper cutting depth of the shrimp regardless of its size.

At the final station a second disc having a plurality of peripheral needles is used as a transfer and take off wheel which allows the shrimp to be efficiently transferred from the first disc to the second disc for ejection from the housing in a desired posture. The second disc and needles in conjunction with the housing tunnel guidance ventral, then dorsal, allows for impaling shrimp dorsally for being transferred in the proper attitude onto a flat surface such as a moving belt in the appropriate posture for subsequent processing such as inspection, and/or breading.

It is an object of this invention to provide an improved apparatus for processing "whole round" or "butterflied" fantail shrimp that includes the utilization of an initial transport mechanism that aligns the shrimp body in a proper attitude for entrance into the processor housing and simultaneously longitudinally severs the thin abdominal shell while disrupting the swimmerets and the interconnection between the swimmerets and the shrimp body.

Another object of this invention is to provide an improved apparatus for processing fantail shrimp which allows for an expeditious and efficient ejection of the shrimp body from the processor in a desired posture.

And yet still another object of this invention is to provide an improved apparatus for processing fantail shrimp that has enhanced pneumatic characteristics for effectively removing the front five shell segments and the sand vein from a shrimp body.

In accordance with these and other objects which will be apparent hereinafter, the instant invention will now be described with particular reference to the accompanying drawings.

BRIEF DESCRIPTION OF THE DRAWINGS

FIG. 2 shows a fragmentary view in side elevation showing a portion of the inlet trough assembly, a serrated wheel and the internal housing tunnel.

FIG. 2a shows a cross sectional view in the direction of line 2a—2a of FIG. 2 of the housing.

FIG. 3 shows a top plan view of the inlet trough assembly utilized in the instant invention.

FIG. 4 shows a perspective view of a portion of the inlet trough assembly utilizing the present invention.

FIG. 5 shows a perspective fragmentary view of a portion of the serrated wheel utilized in the instant invention.

FIG. 6 shows a fragmentary view in side elevation showing a portion of the housing tunnel as utilized in the instant invention.

FIG. 7 shows a top plan view of the arcuate lever arm shown in FIG. 6.

FIG. 8 shows a front cross sectional view of the arcuate lever arm shown in FIG. 7 and its relationship to the needles.

FIG. 9 shows a perspective view of the peeling arm utilized in the instant invention.

FIG. 10 shows a fragmentary side elevational view of the internal tunnel in the housing and the knife blade used for butterflying the shrimp.

FIG. 11 shows a front cross sectional elevational view of the knife blade and tunnel shown in FIG. 10.

FIG. 12 shows a fragmentary side elevational view of an additional waste disposal passage and debris collector utilized in the present invention.

FIG. 13 shows a side elevational view of the perspective schematic view showing FIG. 14.

FIG. 14 shows a schematic diagram of the gear train utilized for driving the serrating wheel in the present invention.

PREFERRED EMBODIMENT

Figure 1:
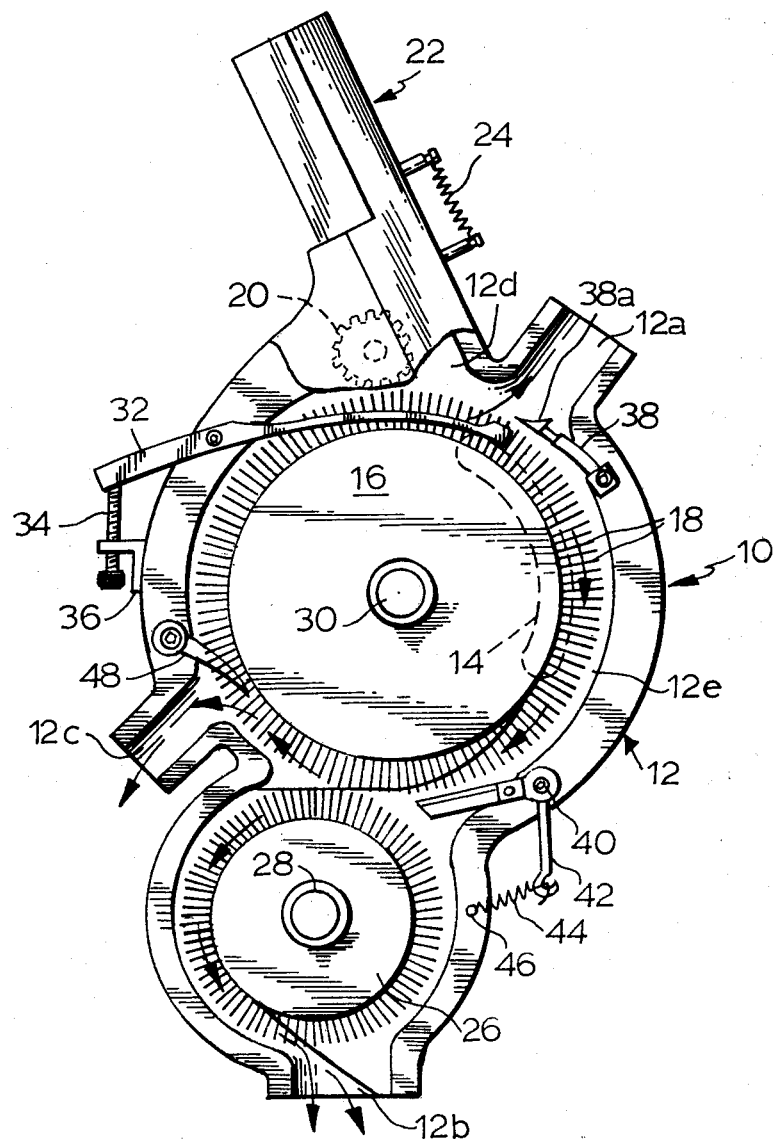
FIG. 1 shows a side elevational view partially cutaway showing the present invention with the housing cover removed.

Referring now the drawings and specifically FIG. 1, the present invention is shown generally at 10 comprised of a housing 12 that contains a positively driven disc 16 having a plurality of needles 18 peripherally disposed thereon. The disc and needles are mounted in communication with tunnel portion 12d and 12e which have a selected shape useful for guiding the shrimp body as is described in greater detail below. Attached to the upper portion of the housing is a inlet trough assembly 22 into which the unprocessed shrimp bodies are deposited sequentially. A second disc 26 is utilized to remove the processed shrimp from the housing.

In general, assembly 22 constitutes the inlet or first station of the device in conjunction with serrated wheel 20. The second station where the shell is removed and the mid-gut vein exposed and removed occurs near peeling arm 38a and the junction of tunnel portion 12d and the outlet vacuum passage 12a. A subsequent station occurs at knife blade 40 which provides a butterfly configuration to the shrimp if desired. The final station occurs in conjunction with disc 26 and passage 12b from which the shrimp are ejected in a desired posture.

The shell and other debris from the ventral appendages are removed through outlet passage 12a by the pneumatic induction or the vacuum created by vacuum inducing means (not shown attached to the outlet of passage 12a). The housing 12 includes an enlarged air opening 14 on each side which is in a direct path and in fluid communication with passage 12a such that the volume and direction of the air flow from opening 14 to and through passage 12a greatly enhances the removal of the shell, the other debris and removal of the sand vein.

Passage 12c in conjunction with a blade 48 disposed between the rows of needles 18 collects extra debris not removed through passage 12a.

Referring now to FIG. 2, the inlet trough assembly 22 which includes vertical moving walls 50 and 52 and a ventral guidance trough 74 is positioned relative to a serrated wheel 20 that rotates at its periphery faster than the moving belt 52. The trough assembly includes additional support structure 64 which connects into the housing 12. An entrance tunnel 11 in the housing 12 provides a path for shrimp laterally engaged between belts 50 and 52 which pass over the serrated wheel 20 severing longitudinally the thin belly shell while disrupting the swimmerets and any other ventral appendages prior to the shrimp's entry into the housing. A disc 16 having needles 18 receives the shrimp body in the entrance upon which the shrimp are impaled for transport to the next station. An arcuate lever arm 32 adjustable by member 34 is pivotally fixed by nut 33 to the housing which provides ventral guidance on the shrimp when impaled on needles 18. The arcuate lever arm 32 is adjusted for various size shrimp to provide the proper ventral guidance to position the shrimp body in the proper alignment upon the shrimp body's arrival at the peeling arm 38, having a cutting edge 38a described below. Passage 12a has a vacuum induced therein producing a pneumatic force to allow removal of the shell and other debris. The tunnel in housing 12 from entrance 11 is shaped to provide dorsal guidance on the shrimp body for impaling and proper attitude alignment upon arrival at the peeling arm 38. The inlet trough assembly 22 as shown in FIGS. 3 and 4 also provides for alignment so that the shrimp arrives at the entrance to the housing in the proper attitude. The inlet trough assembly 22 includes a ventral guidance trough 74 having a hinge 98 connected thereto that allows for vertical adjustment of trough 74 by a threaded adjuster 76. The trough 74 is "V"-shaped for alignment of the shrimp as it progresses by the movement of pulleys 70 and 72, pulleys 58 and 60 in conjunction with pressure rollers 54 and 56 that move the vertical walls 50 and 52 that laterally engage the shrimp between. The adjustable trough allows for vertical adjustment depending on the various size shrimp to provide the proper attitude on the shrimp as it arrives at the serrated wheel 20 which effects the longitudinal severing of the thin ventral membrane and distuption of the swimmerets and the interconnections between the swimmerets. As shown in FIG. 3 the tensioning spring 24 which is attached and adjustable to each vertical belt 50 and 52 and the pulley arms 62 and 64 provide for lateral tensioning and centering of the shrimp body. Elements 66 and 68 provide for tensioning of belts 52 and 50 respectively.

FIG. 5 shows the serrated wheel 20 which may include grooves 21 which aid in the severing and disruption of the ventral area of the shrimp prior to its entrance into tunnel 11 in the housing 12.

FIGS. 2, 6 and 7 show the arcuate lever arm 32 and its relationship to the moving needles 18 on disc 16 that provides ventral guidance along portion 32c so that the shrimp body arrives near the outlet vacuum passage 12a in the proper head-up attitude for engagement with the peeling arm end 38b. As shown in FIGS. 6, 7, 8 and 9 the peeling arm 38 which is disposed at the opening of outlet vacuum passage 12a serves two functions. First, the blunt end of the peeling arm 38b engages the front upper dorsal portion in or near the sand vein canal of the shrimp body causing it to expand slightly allowing it to be severed longitudinally to the proper depth by knife edge 38a. This allows for exposure of the mid-gut vein or sand vein for pneumatic and hydraulic treatment for removal of the vein and residue therein. An orifice 38c (FIGS. 6 and 9) disposed in the peeling arm 38 is in fluid communication with a hydraulic source to allow hydraulic assistance for cleaning the mid-gut vein. Another function served by peeling arm 38 is to insure removal of the first five shell segments from the shrimp meat. In normal operation the pneumatic vacuum force in outlet passage 12a is sufficient to displace the first five shell segments sufficiently away from the body of the shrimp to break the condyle joint.

Once the shell has been removed by the vacuum action in outlet passage 12a and other debris such as the swimmerets and the interconnection between the swimmerets and any other appendages on the ventral side of the shrimp body, the shrimp meat passes through the next station shown in FIGS. 10 and 11. At this station a knife blade 41 which is adjustable by lever arm 42 and spring 44 which is connected to the housing 46 provides for severing the dorsal area longitudinally of the shrimp work product for a butterfly configuration, if desired. The internal tunnel 11 of the housing causes ventral force on the shrimp work piece such that it engages the knife blade 41 at the proper attitude. The dotted blade shows the operational butterfly position. If "whole round" shrimp are desired, the blade 41 is positioned not to engage the shrimp body.

FIG. 12 shows a final debris collector for cleaning the device for residue that may pass through with the work piece that is ejected out passage 12c under gravity or vacuum or the like. The cleaning blade 48 is disposed between the rows of needles 18 to act as a lever to remove any debris collecting between the needles.

The pulleys in the inlet trough assembly and the serrated wheel are driven by conventional drive means which may be connected to the main motor shaft 30 (FIG. 1).

The instant invention has been shown and described herein in what is considered to be the most practical and preferred emodiment. It is recognized, however, that departures may be made therefrom within the scope of the invention and that obvious modifications will occur to a person skilled in the art.

What I claim is:

1. A device for processing shrimp and the like arthropoda comprising:

a housing, a tunnel opening through said housing including a main portion and outwardly opening infeed and discharge end portions interconnected by said main portion;

means to ventrally impale shrimp fed into said infeed portion of said tunnel and to transport them through said main tunnel portion and said discharge end portion;

an operating means positioned relative to the path of advance through said main tunnel portion to longitudinally disrupt and remove the abdominal membrane of each shrimp positioned thereupon to loosen the front shell sections therefrom, said operating means disposed within said main portion of said tunnel to longitudinally slit the dorsal side of the shrimp meat to expose the mid-gut vein as said ventrally impaled shrimp are advanced by said transport means through said main tunnel portion; and air flow inducing vacuum means opening into said main tunnel portion to pneumatically advance the shrimp fed into said infeed portion therethrough into ventral engagement with said transport means and to pneumatically displace the swimmerets, front shell section and mid-gut vein from each impaled shrimp meat being transported through said main tunnel portion and to discharge such debris from the device, said air flow induced pneumatic means including an enlarged opening disposed on each side of said housing strategically positioned in fluid communication relative to said transport means and said discharge section for displacement of the shrimp shell from the meat without displacement of the meat from the transport means;

a second transport means having an impaling means disposed thereupon in communication with said first transport means and disposed within said tunnel, said second transport means impaling said shrimp in a dorsal direction and receiving said shrimp from said first transport means, said tunnel including a wall portion shaped for removing said shrimp from said second transport means for ejection from said housing.

* * * * *